United States Patent
Zenzai

(10) Patent No.: US 11,335,501 B2
(45) Date of Patent: May 17, 2022

(54) MULTILAYER CERAMIC ELECTRONIC COMPONENT AND METHOD FOR PRODUCING THE SAME

(71) Applicant: Murata Manufacturing Co., Ltd., Nagaokakyo (JP)

(72) Inventor: Kota Zenzai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 45 days.

(21) Appl. No.: 16/897,321

(22) Filed: Jun. 10, 2020

(65) Prior Publication Data

US 2021/0057154 A1 Feb. 25, 2021

(30) Foreign Application Priority Data

Aug. 23, 2019 (JP) .............................. JP2019-152962

(51) Int. Cl.
| | | |
|---|---|---|
| *H01G 4/12* | (2006.01) | |
| *H01G 4/30* | (2006.01) | |
| *H01G 4/008* | (2006.01) | |
| *H01G 4/224* | (2006.01) | |
| *H01G 4/232* | (2006.01) | |

(52) U.S. Cl.
CPC .............. *H01G 4/008* (2013.01); *H01G 4/12* (2013.01); *H01G 4/224* (2013.01); *H01G 4/2325* (2013.01); *H01G 4/30* (2013.01)

(58) Field of Classification Search
CPC .......... H01G 4/232; H01G 4/248; H01G 4/12; H01G 4/224; H01G 4/2325; H01G 4/30; H01G 4/012; H01G 4/008
USPC .............. 361/306.3, 309, 321.2, 301.4, 321.3
See application file for complete search history.

(56) References Cited

U.S. PATENT DOCUMENTS 6,381,117 B1 * 4/2002 Nakagawa ................ H01G 2/14
361/306.3
2009/0052114 A1 2/2009 Motoki et al.
2015/0103466 A1 * 4/2015 Engel ..................... H01G 4/232
361/301.4

FOREIGN PATENT DOCUMENTS

JP 11-162771 A 6/1999
JP 2009-295602 A 12/2009

* cited by examiner

*Primary Examiner* — Arun Ramaswamy
(74) *Attorney, Agent, or Firm* — Keating & Bennett, LLP

(57) ABSTRACT

A multilayer ceramic electronic component includes a multilayer body including a plurality of stacked ceramic layers and a plurality of stacked inner electrode layers, and outer electrodes on end surfaces of the multilayer body. The outer electrodes include underlying electrode layers on the end surfaces, conductive resin layers that cover the underlying electrode layers, and plating layers that cover the conductive resin layers. The underlying electrode layers are joined to the plating layers in connecting portions without the conductive resin layers interposed between the underlying electrode layers and the plating layers.

13 Claims, 7 Drawing Sheets

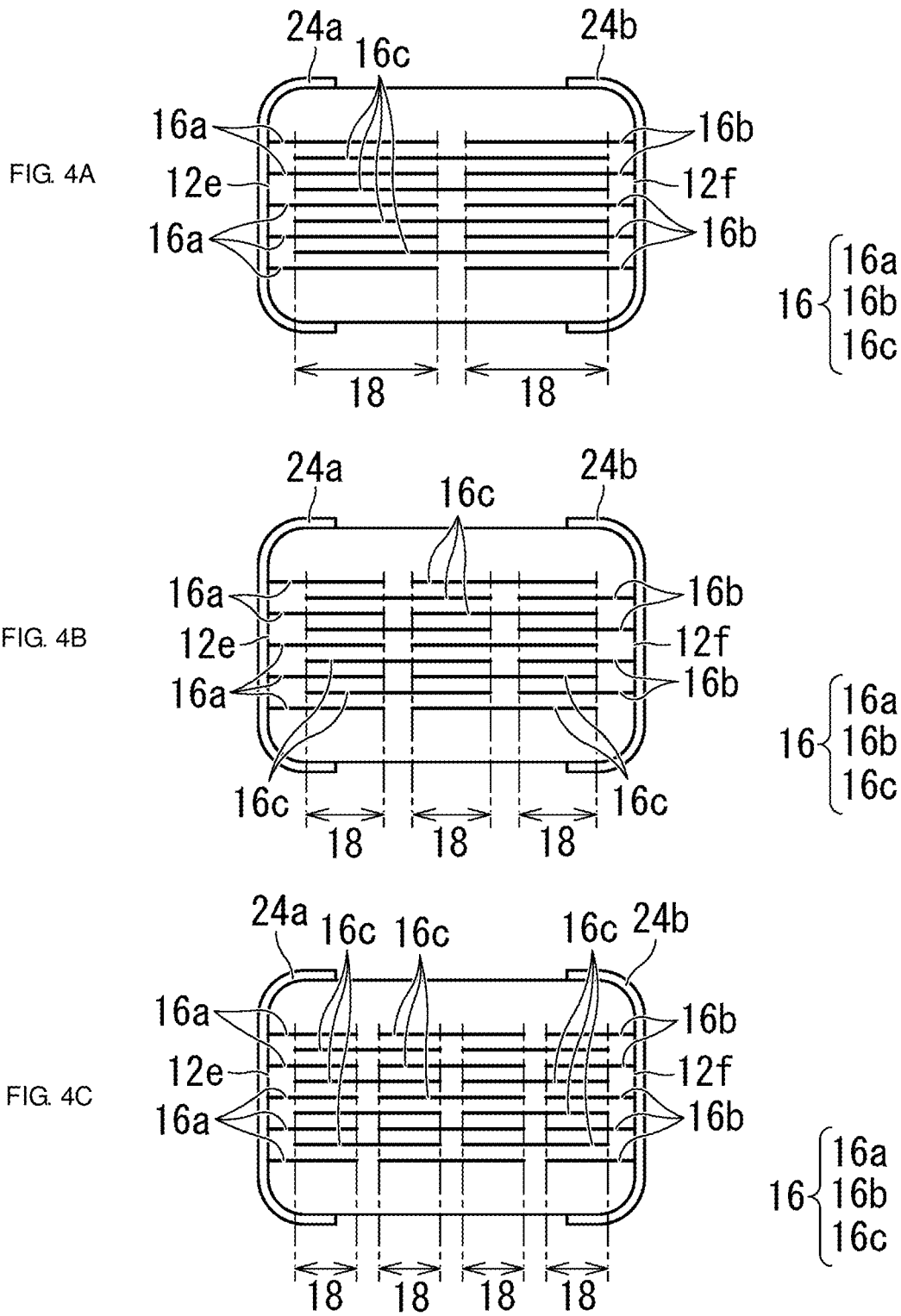

MULTILAYER CERAMIC ELECTRONIC COMPONENT AND METHOD FOR PRODUCING THE SAME

CROSS REFERENCE TO RELATED APPLICATIONS

This application claims the benefit of priority to Japanese Patent Application No. 2019-152962 filed on Aug. 23, 2019. The entire contents of this application are hereby incorporated herein by reference.

BACKGROUND OF THE INVENTION

1. Field of the Invention

The present invention relates to a multilayer ceramic electronic component and a method for producing the same.

2. Description of the Related Art

In recent years, ceramic electronic components such as multilayer ceramic capacitors have come to be used in harsher environments than in the past.

For example, multilayer ceramic capacitors used in mobile devices such as cellular phones and portable music players are required to withstand impacts resulting from being dropped. Specifically, it is necessary to ensure that such a multilayer ceramic capacitor does not detached from a circuit substrate and does not crack even when the multilayer ceramic capacitor receives an impact resulting from being dropped.

In addition, multilayer ceramic capacitors used in in-vehicle devices, such as an engine control unit (ECU), are required to withstand a shock resulting from a heat cycle. Specifically, it is necessary to ensure that cracks are not generated in such a multilayer ceramic capacitor even when the multilayer ceramic capacitor is subjected to a heat cycle and receives a bending stress generated by thermal expansion and contraction of a circuit substrate due to the heat cycle.

In view of this, it has been proposed that a thermosetting conductive resin paste is used for outer electrodes of multilayer ceramic capacitors. For example, in Japanese Unexamined Patent Application Publication No. 11-162771, a countermeasure is taken to ensure that cracks are not generated in a multilayer ceramic capacitor body even in a harsh environment by forming an epoxy-based thermosetting resin layer (conductive resin layer) between a known electrode layer (underlying electrode layer) and Ni plating.

In this configuration, when a stress due to an impact resulting from dropping or a bending stress generated by thermal expansion and contraction of a circuit substrate due to a heat cycle is generated, the stress that propagates through a circuit substrate (deformation of the circuit substrate) is released by causing separation between the electrode layer (underlying electrode layer) and the epoxy-based thermosetting resin layer (conductive resin layer) from a leading end of the epoxy-based thermosetting resin layer (conductive resin layer) serving as a starting point so that the multilayer ceramic capacitor body does not crack.

However, the multilayer ceramic capacitor disclosed in Japanese Unexamined Patent Application Publication No. 11-162771 has a problem in that when bending of the substrate increases, the stress cannot be released in some cases. In view of this, in Japanese Unexamined Patent Application Publication No. 2009-295602, cracks and degradation of electrical characteristics are suppressed by disposing an electrode layer (underlying electrode layer) only on an end surface of a multilayer body.

In the case where an electrode layer (underlying electrode layer) is disposed only on an end surface of a multilayer body as in Japanese Unexamined Patent Application Publication No. 2009-295602, the joining between the electrode layer (underlying electrode layer) and the epoxy-based thermosetting resin layer (conductive resin layer) is an electrical connection established by contact of a metal powder in a conductive resin. Accordingly, the electrical connection strength between the electrode layer (underlying electrode layer) and the epoxy-based thermosetting resin layer (conductive resin layer) is weak, which may result in a problem of an increase in the equivalent series resistance (ESR) of the multilayer ceramic electronic component.

SUMMARY OF THE INVENTION

Preferred embodiments of the present invention provide multilayer ceramic electronic components that are each unlikely to crack and that can have a reduced equivalent series resistance (ESR) and methods for producing the multilayer ceramic electronic components.

According to a preferred embodiment of the present invention, a multilayer ceramic electronic component includes a multilayer body including a plurality of stacked ceramic layers and including a first main surface and a second main surface that are opposite to each other in a stacking direction, a first side surface and a second side surface that are opposite to each other in a width direction orthogonal or substantially orthogonal to the stacking direction, and a first end surface and a second end surface that are opposite to each other in a length direction orthogonal or substantially orthogonal to the stacking direction and the width direction, a plurality of first inner electrode layers that are stacked alternately with the plurality of ceramic layers and exposed at the first end surface, a plurality of second inner electrode layers that are stacked alternately with the plurality of ceramic layers and exposed at the second end surface, a first outer electrode that is connected to the first inner electrode layers and disposed on the first end surface, and a second outer electrode that is connected to the second inner electrode layers and disposed on the second end surface. The first outer electrode includes a first underlying electrode layer that is connected to the first inner electrode layers and disposed on the first end surface, a first conductive resin layer covering the first underlying electrode layer, and a first plating layer covering the first conductive resin layer. The second outer electrode includes a second underlying electrode layer that is connected to the second inner electrode layers and disposed on the second end surface, a second conductive resin layer covering the second underlying electrode layer, and a second plating layer covering the second conductive resin layer. The first underlying electrode layer and the first plating layer are joined to each other in a first connecting portion without the first conductive resin layer interposed therebetween, and the second underlying electrode layer and the second plating layer are joined to each other in a second connecting portion without the second conductive resin layer interposed therebetween.

With the multilayer ceramic electronic component according to the above-described preferred embodiment of the present invention, the first underlying electrode layer and the second underlying electrode layer are only on the end surfaces of the multilayer body and covering the inner electrode layers. Cracks are typically easily generated between the multilayer body and the first underlying electrode layer and between the multilayer body and the second underlying electrode layer by, for example, bending of a substrate. However, the generation of cracks is able to be reduced or prevented by providing the first underlying electrode layer and the second underlying electrode layer only on the end surfaces of the multilayer body.

Furthermore, the first underlying electrode layer and the first plating layer are directly joined to each other in the first connecting portion, and the second underlying electrode layer and the second plating layer are directly joined to each other in the second connecting portion. The first underlying electrode layer and the first plating layer are joined to each other without the first conductive resin layer, which has a high resistance, interposed therebetween. The second underlying electrode layer and the second plating layer are joined to each other without the second conductive resin layer, which has a high resistance, interposed therebetween. Therefore, the equivalent series resistance (ESR) of the outer electrodes can be reduced overall. In a multilayer ceramic electronic component, a large amount of current flows through corner portions and ridge line portions of the first underlying electrode layer and the second underlying electrode layer. When the first conductive resin layer or the second conductive resin layer, which has a weak electrical connection strength, is between the first underlying electrode layer and the first plating layer and between the second underlying electrode layer and the second plating layer, electrical loss is caused. Accordingly, the joining in the first connecting portion and the second connecting portion without the first conductive resin layer or the second conductive resin layer interposed therebetween enables the current to be efficiently caused to flow.

According to a preferred embodiment of the present invention, a method for producing a multilayer ceramic electronic component includes the steps of, in a multilayer body including a plurality of stacked ceramic layers and including a first main surface and a second main surface that are opposite to each other in a stacking direction, a first side surface and a second side surface that are opposite to each other in a width direction orthogonal or substantially orthogonal to the stacking direction, and a first end surface and a second end surface that are opposite to each other in a length direction orthogonal or substantially orthogonal to the stacking direction and the width direction, forming a first underlying electrode layer and a second underlying electrode layer on the first end surface and the second end surface, respectively, forming a first conductive resin layer and a second conductive resin layer to cover the first underlying electrode layer and the second underlying electrode layer, respectively, and forming a first plating layer and a second plating layer to cover the first conductive resin layer and the second conductive resin layer, respectively. In the method, the first underlying electrode layer and the first plating layer are directly joined to each other in a first connecting portion, and the second underlying electrode layer and the second plating layer are directly joined to each other in a second connecting portion.

With the method for producing a multilayer ceramic electronic component according to the above-described preferred embodiment of the present invention, the first underlying electrode layer and the first plating layer are directly joined to each other in the first connecting portion, and the second underlying electrode layer and the second plating layer are directly joined to each other in the second connecting portion. Therefore, the first underlying electrode layer and the first plating layer are joined to each other without the first conductive resin layer, which has a high resistance, interposed therebetween, and the second underlying electrode layer and the second plating layer are joined to each other without the second conductive resin layer, which has a high resistance, interposed therebetween. Thus, the equivalent series resistance (ESR) of the outer electrodes is able to be reduced overall.

According to preferred embodiments of the present invention, it is possible to provide multilayer ceramic electronic components that are each unlikely to crack and that each have a reduced equivalent series resistance (ESR) and methods for producing the multilayer ceramic electronic components.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a view illustrating a structure in which a facing-electrode portion of inner electrode layers of a multilayer body is divided into two portions in a multilayer ceramic capacitor according to a preferred embodiment of the present invention.

FIG. 4B is a view illustrating a structure in which a facing-electrode portion of inner electrode layers of a multilayer body is divided into three portions in a multilayer ceramic capacitor according to a preferred embodiment of the present invention.

FIG. 4C is a view illustrating a structure in which a facing-electrode portion of inner electrode layers of a multilayer body is divided into four portions in a multilayer ceramic capacitor according to a preferred embodiment of the present invention.

DETAILED DESCRIPTION OF THE PREFERRED EMBODIMENTS

1. Multilayer Ceramic Electronic Component

Multilayer ceramic electronic components according to preferred embodiments of the present invention will be described. In a preferred embodiment of the present invention, a multilayer ceramic capacitor 10 will be described as an example of the multilayer ceramic electronic component. However, the multilayer ceramic electronic component is not limited to a multilayer ceramic capacitor.

Figure 1:
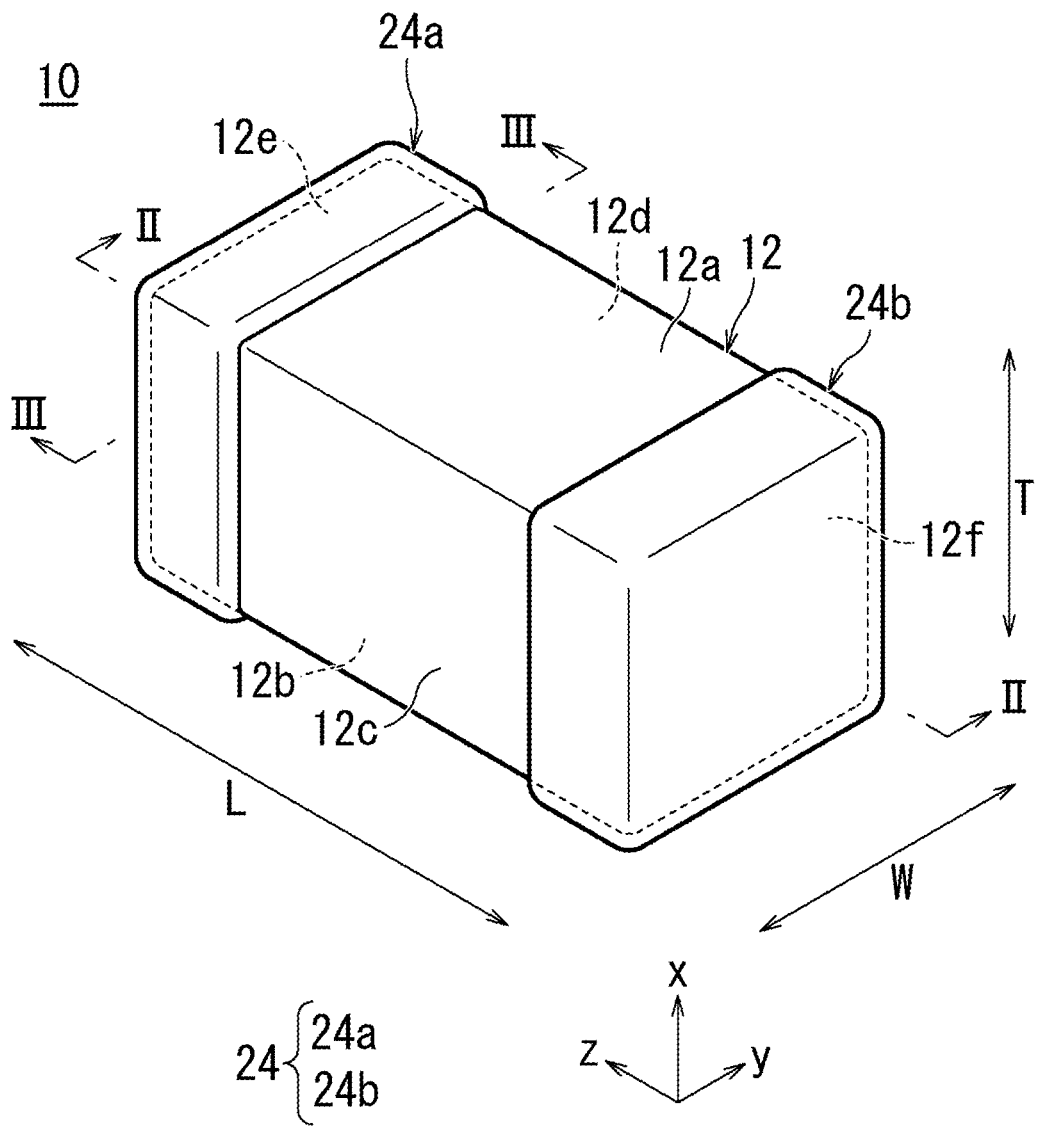
FIG. 1 is a perspective view illustrating an example of a multilayer ceramic capacitor according to a preferred embodiment of the present invention.
Figure 2:
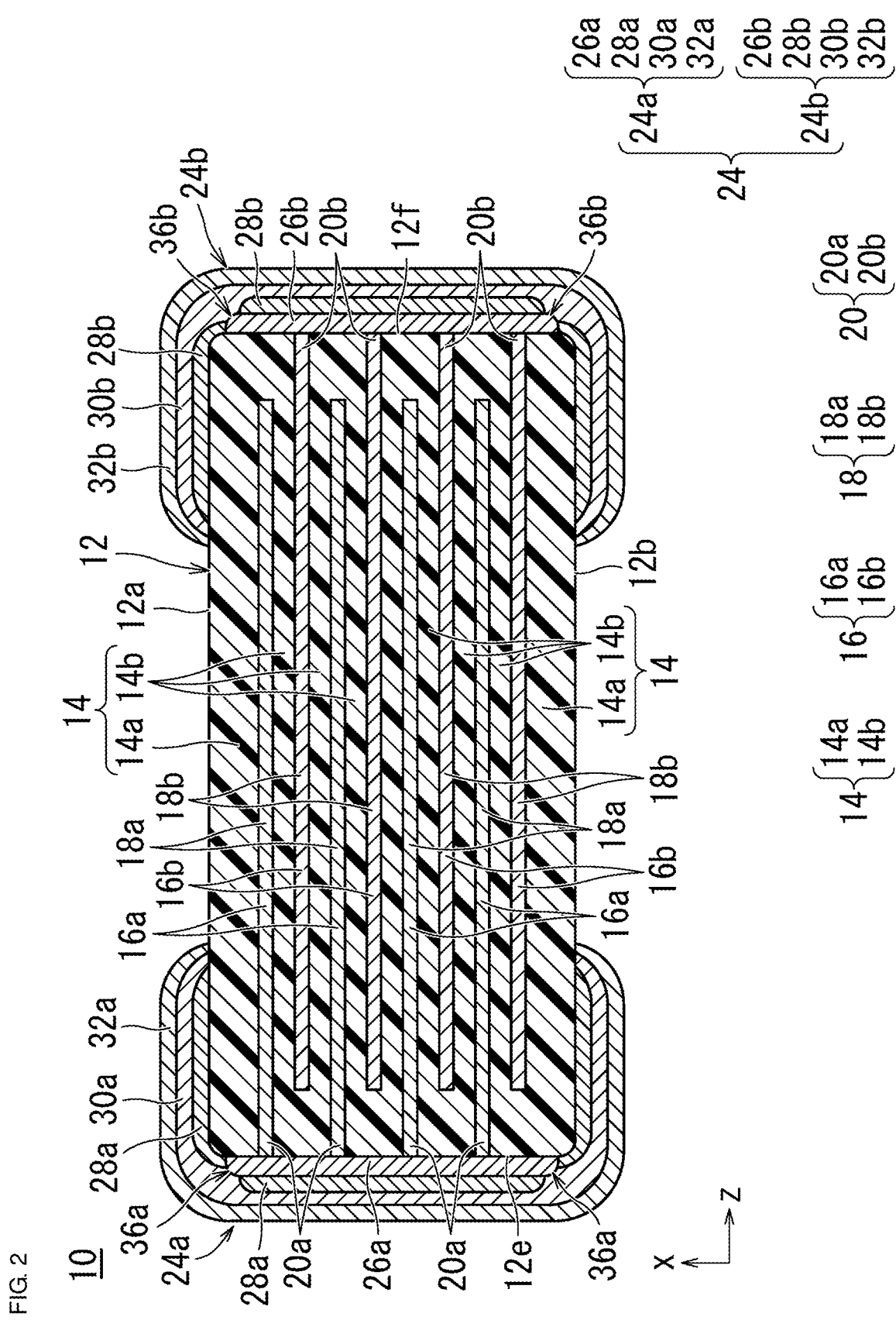
FIG. 2 is a sectional view taken along line II-II in FIG. 1 illustrating the multilayer ceramic capacitor.
Figure 3:
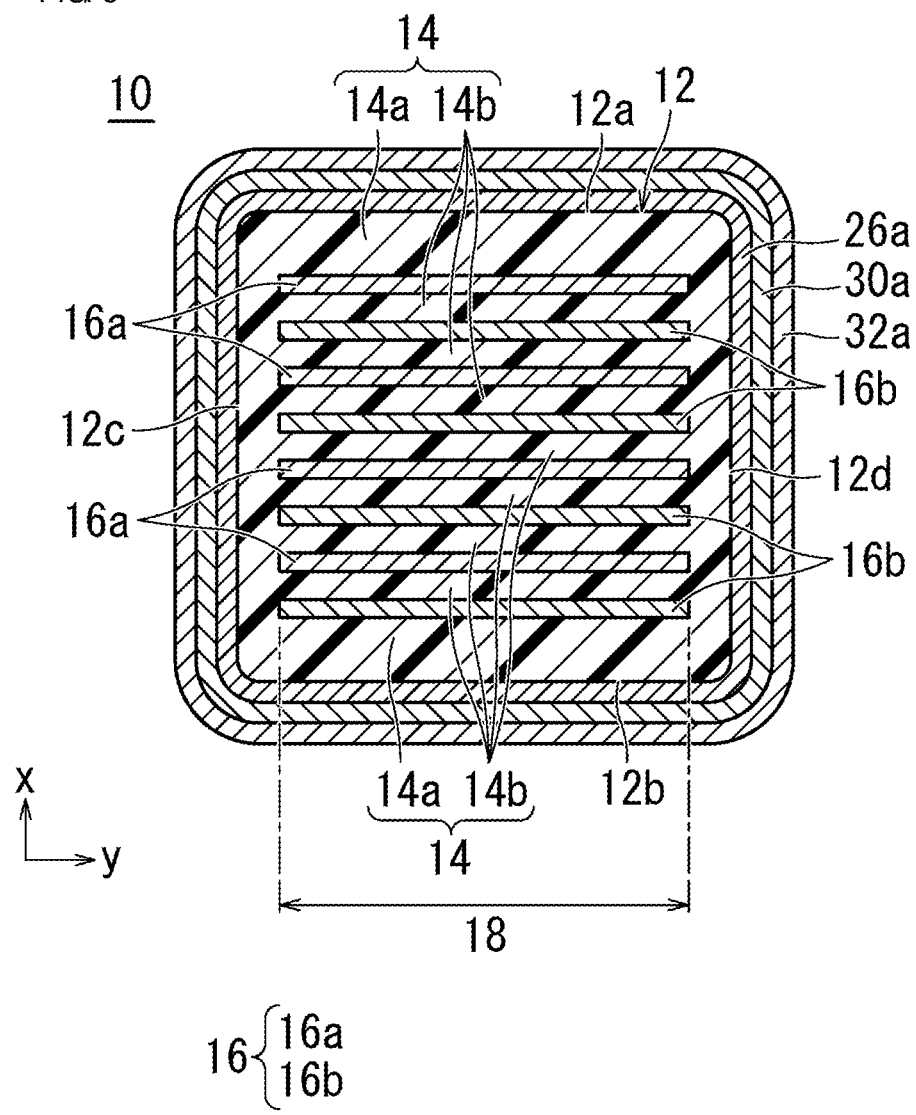
FIG. 3 is a sectional view taken along line in FIG. 1 illustrating the multilayer ceramic capacitor.

The multilayer ceramic capacitor 10 according to a preferred embodiment of the present invention will be described with reference to FIGS. 1 to 4C. FIG. 1 is an appearance perspective view illustrating an example preferred embodiment of a multilayer ceramic capacitor according to the present invention. FIG. 2 is a sectional view taken along line II-II in FIG. 1 illustrating the multilayer ceramic capacitor. FIG. 3 is a sectional view taken along line in FIG. 1 illustrating the multilayer ceramic capacitor. FIG. 4A is a view illustrating a structure in which a facing-electrode portion of inner electrode layers is divided into two portions in a multilayer ceramic capacitor according to a preferred embodiment of the present invention. FIG. 4B is a view illustrating a structure in which a facing-electrode portion of inner electrode layers is divided into three portions in a multilayer ceramic capacitor according to a preferred embodiment of the present invention. FIG. 4C is a view illustrating a structure in which a facing-electrode portion of inner electrode layers is divided into four portions in a multilayer ceramic capacitor according to a preferred embodiment of the present invention.

As illustrated in FIGS. 1 to 3, the multilayer ceramic capacitor 10 includes a rectangular or substantially rectangular parallelepiped multilayer body 12.

(1) Multilayer Body

The multilayer body 12 includes a plurality of ceramic layers 14 and a plurality of inner electrode layers 16, the ceramic layers 14 and the inner electrode layers 16 being stacked, and includes a first main surface 12a and a second main surface 12b that are opposite to each other in a stacking direction x, a first side surface 12c and a second side surface 12d that are opposite to each other in a width direction y orthogonal or substantially orthogonal to the stacking direction x, and a first end surface 12e and a second end surface 12f that are opposite to each other in a length direction z orthogonal or substantially orthogonal to the stacking direction x and the width direction y. Corner portions and ridge line portions of the multilayer body 12 are preferably rounded. The term "corner portion" refers to a portion of the multilayer body 12 where three adjacent surfaces thereof intersect. The term "ridge line portion" refers to a portion of the multilayer body 12 where two adjacent surfaces thereof intersect. Furthermore, irregularities or the like may be provided on a portion or the entirety of the first main surface 12a and the second main surface 12b, the first side surface 12c and the second side surface 12d, and the first end surface 12e and the second end surface 12f.

(a) Ceramic Layer

The ceramic layers 14 preferably include outer layer portions 14a defined by a plurality of ceramic layers 14 and an inner layer portion 14b defined by a plurality of ceramic layers 14 and a plurality of inner electrode layers 16. The outer layer portions 14a are located on the first main surface 12a side and the second main surface 12b side of the multilayer body 12 and are ceramic layers located between the first main surface 12a and the inner electrode layer 16 closest to the first main surface 12a and between the second main surface 12b and the inner electrode layer 16 closest to the second main surface 12b. The region sandwiched between the two outer layer portions 14a defines the inner layer portion 14b.

Preferred examples of the ceramic material of the ceramic layers 14 include dielectric ceramics including, as a main component, $BaTiO_3$, $CaTiO_3$, $SrTiO_3$, $CaZrO_3$, or the like. Alternatively, ceramics obtained by adding an auxiliary component such as a Mn compound, an Fe compound, a Cr compound, a Co compound, or a Ni compound to any of these main components may also be used.

For example, when the multilayer ceramic electronic component is a piezoelectric component, the ceramic layers 14 can be made of a piezoelectric ceramic. Specific preferred examples of the piezoelectric ceramic include lead zirconate titanate (PZT)-based ceramics.

For example, when the multilayer ceramic electronic component is a thermistor, the ceramic layers 14 can be made from a semiconductor ceramic. Specific preferred examples of the semiconductor ceramic include spinel-based ceramics.

For example, when the multilayer ceramic electronic component is an inductor, the ceramic layers 14 can be made of a magnetic ceramic. Specific preferred examples of the magnetic ceramic include ferrite ceramics.

The ceramic layers 14 each preferably have a thickness of about 0.4 μm or more and about 20 μm or less, for example. The number of ceramic layers including those defining the outer layer portions 14a is preferably about 15 or more and about 1550 or less, for example. The outer layer portions 14a each preferably have a thickness of about 20 μm or more and about 300 μm or less, for example.

The inner electrode layers 16 include a plurality of first inner electrode layers 16a that are stacked alternately with a plurality of ceramic layers 14 and that are exposed at the first end surface 12e and a plurality of second inner electrode layers 16b that are stacked alternately with a plurality of ceramic layers 14 and that are exposed at the second end surface 12f. The first inner electrode layers 16a and the second inner electrode layers 16b are parallel or substantially parallel to the first main surface 12a and the second main surface 12b. The first inner electrode layers 16a and the second inner electrode layers 16b may be parallel or substantially parallel to the first side surface 12c and the second side surface 12d.

The first inner electrode layers 16a each include a first facing-electrode portion 18a that opposes a second inner electrode layer 16b and a first extended electrode portion 20a that extends from the first facing-electrode portion 18a to the first end surface 12e of the multilayer body 12. An end portion of the first extended electrode portion 20a of the first inner electrode layer 16a extends to the first end surface 12e of the multilayer body 12 and forms an exposed portion.

The second inner electrode layers 16b each include a second facing-electrode portion 18b that opposes a first inner electrode layer 16a and a second extended electrode portion 20b that extends from the second facing-electrode portion 18b to the second end surface 12f of the multilayer body 12. An end portion of the second extended electrode portion 20b of the second inner electrode layer 16b extends to the second end surface 12f of the multilayer body 12 and forms an exposed portion.

A facing-electrode portion 18 is defined by the first facing-electrode portions 18a of the first inner electrode layers 16a and the second facing-electrode portions 18b of the second inner electrode layers 16b. The shape of each of the first facing-electrode portions 18a and the second facing-electrode portions 18b is not particularly limited but is preferably a rectangular or substantially rectangular shape. However, corner portions of the first facing-electrode portions 18a and the second facing-electrode portions 18b may be rounded or may be obliquely provided, for example, in a tapered or substantially tapered shape, if so desired.

An extended electrode portion 20 is defined by the first extended electrode portions 20a of the first inner electrode layers 16a and the second extended electrode portions 20b of the second inner electrode layers 16b. The shape of each of the first extended electrode portions 20a and the second extended electrode portions 20b is not particularly limited but is preferably a rectangular or substantially rectangular shape. However, corner portions of the first extended electrode portions 20a and the second extended electrode portions 20b may be rounded or may be obliquely formed, for example, in a tapered or substantially tapered shape.

The width of each of the first facing-electrode portions 18a of the first inner electrode layers 16a and the second facing-electrode portions 18b of the second inner electrode layers 16b may be the same as the width of each of the first extended electrode portions 20a of the first inner electrode layers 16a and the second extended electrode portions 20b of the second inner electrode layers 16b. Alternatively, either one of these widths may be smaller than the other width.

As illustrated in FIGS. 4A to 4C, inner electrode layers 16 may include floating inner electrode layers 16c each of which is extended neither to a first end surface 12e nor to a second end surface 12f, and the inner electrode layers 16 may have a structure in which a facing-electrode portion 18 is divided into a plurality of portions by the floating inner electrode layers 16c. Examples of the structure include a double structure (refer to FIG. 4A), a triple structure (refer to FIG. 4B), and a quadruple structure (refer to FIG. 4C). The structure may be a quadruple or higher structure. With this structure in which the facing-electrode portion 18 is divided into a plurality of portions, a plurality of capacitor components are provided between inner electrode layers 16 that oppose each other to provide a configuration in which these capacitor components are connected in series. Therefore, a voltage applied to each of the capacitor components decreases, and a withstand voltage of the multilayer ceramic capacitor 10 can be increased.

The first inner electrode layers 16a and the second inner electrode layers 16b can be made of, for example, an appropriate conductive material such as a metal, e.g., Ni, Cu, Ag, Pd, or Au or an alloy containing at least one of these metals, e.g., an Ag—Pd alloy.

In the present preferred embodiment, the first facing-electrode portions 18a and the second facing-electrode portions 18b face each other with the ceramic layers 14 interposed therebetween to thus generate an electrostatic capacitance. Therefore, an electrostatic capacitance can be provided between a first outer electrode 24a to which the first inner electrode layers 16a are connected and a second outer electrode 24b to which the second inner electrode layers 16b are connected. Accordingly, an electronic component body having the structure described above defines and functions as a capacitor element.

The first inner electrode layers 16a and the second inner electrode layers 16b each preferably have a thickness of, for example, about 0.3 μm or more and about 2.0 μm or less. The number of inner electrode layers is preferably, for example, about 15 or more and about 1550 or less.

An outer electrode 24 preferably includes a first outer electrode 24a connected to the first inner electrode layers 16a and disposed on the first end surface 12e and a second outer electrode 24b connected to the second inner electrode layers 16b and disposed on the second end surface 12f.

The first outer electrode 24a includes a first underlying electrode layer 26a that is electrically connected to the first inner electrode layers 16a and is on the first end surface 12e, a first conductive resin layer 28a covering the first underlying electrode layer 26a, a first plating layer 30a covering the first conductive resin layer 28a, and a third plating layer 32a covering the first plating layer 30a.

The second outer electrode 24b includes a second underlying electrode layer 26b that is electrically connected to the second inner electrode layers 16b and is on the second end surface 12f, a second conductive resin layer 28b covering the second underlying electrode layer 26b, a second plating layer 30b covering the second conductive resin layer 28b, and a fourth plating layer 32b covering the second plating layer 30b.

Underlying Electrode Layer

An underlying electrode layer 26 includes a first underlying electrode layer 26a and a second underlying electrode layer 26b. An inner surface of the first underlying electrode layer 26a is only on the surface of the first end surface 12e of the multilayer body 12. An inner surface of the second underlying electrode layer 26b is only on the surface of the second end surface 12f of the multilayer body 12.

The first underlying electrode layer 26a and the second underlying electrode layer 26b include an electrically conductive metal. The electrically conductive metal may be, for example, Cu, Ni, Ag, Pd, a Ag—Pd alloy, or Au. In particular, the first underlying electrode layer 26a and the second underlying electrode layer 26b are preferably made of Cu, Cu—Sn, Cu—Ni, Ni—Sn, or the like, for example. Preferably, the first underlying electrode layer 26a and the second underlying electrode layer 26b do not include a glass component. The connection areas between the inner electrode layers 16 and the first underlying electrode layer 26a and between the inner electrode layers 16 and the second underlying electrode layer 26b are increased, and thus an electrical connection strength increases.

The first underlying electrode layer 26a and the second underlying electrode layer 26b are preferably formed by, for example, plating, a dipping technique, screen printing, or a sputtering method. The first underlying electrode layer 26a and the second underlying electrode layer 26b each preferably have a thickness of about 4 μm or more and about 7 μm or less, for example. In particular, the thickness of each of the first underlying electrode layer 26a and the second underlying electrode layer 26b is preferably, for example, about 4 µm or more and about 7 µm or less at a position of ½ with respect to a length in the stacking direction. The reason for this is as follows. If the thickness of each of the first underlying electrode layer 26a and the second underlying electrode layer 26b is about 4 µm or less, the effect of reducing the equivalent series resistance (ESR) is not obtained. If the thickness of each of the first underlying electrode layer 26a and the second underlying electrode layer 26b is about 7 µm or more, the first underlying electrode layer 26a and the second underlying electrode layer 26b each have an excessively large thickness, and a length L of the multilayer ceramic capacitor 10 in the length direction is increased.

Conductive Resin Layer

A conductive resin layer 28 preferably includes a first conductive resin layer 28a and a second conductive resin layer 28b. The first conductive resin layer 28a is on the first end surface 12e side of the multilayer body 12 and covers the first underlying electrode layer 26a. The second conductive resin layer 28b is on the second end surface 12f side of the multilayer body 12 and covers the second underlying electrode layer 26b.

A portion where the first underlying electrode layer 26a and the first plating layer 30a described below are joined to each other is referred to as a first connecting potion 36a. A portion where the second underlying electrode layer 26b and the second plating layer 30b described below are joined to each other is referred to as a second connecting potion 36b. A connecting portion 36 has the first connecting potion 36a and the second connecting potion 36b.

Figure 5A:
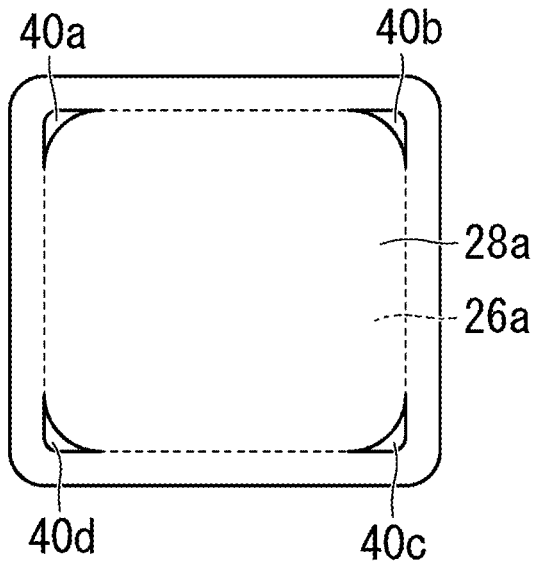
FIG. 5A is a view illustrating an example of the shape in the case where a first connecting portion is at corner portions in a multilayer ceramic capacitor according to a preferred embodiment of the present invention.
Figure 5B:
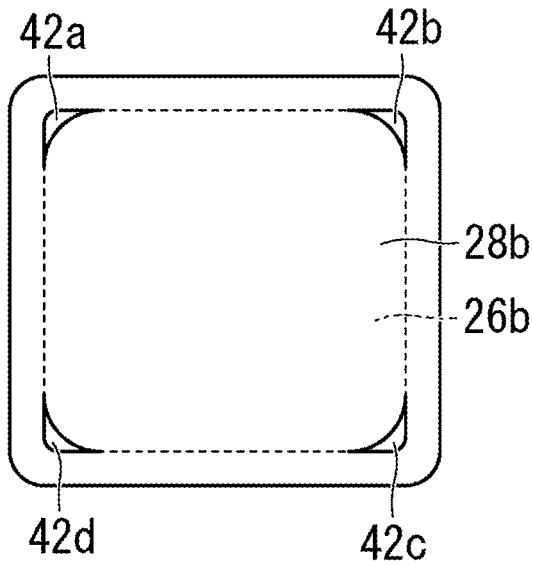
FIG. 5B is a view illustrating an example of the shape in the case where a second connecting portion is at corner portions in a multilayer ceramic capacitor according to a preferred embodiment of the present invention.
Figure 6A:
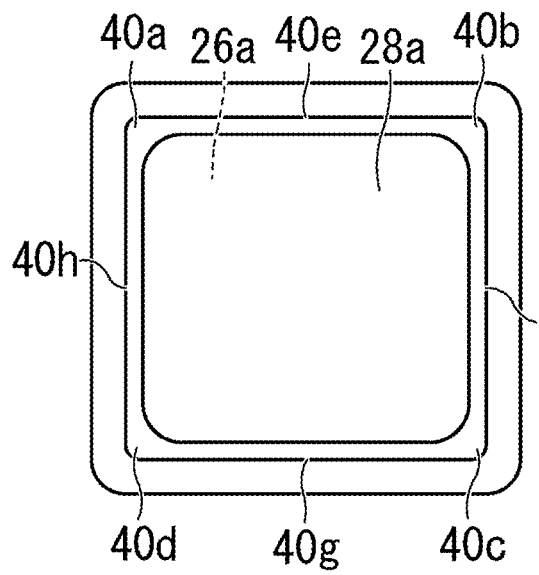
FIG. 6A is a view illustrating an example of the shape in the case where a first connecting portion is on corner portions and ridge line portions in a multilayer ceramic capacitor according to a preferred embodiment of the present invention.
Figure 6B:
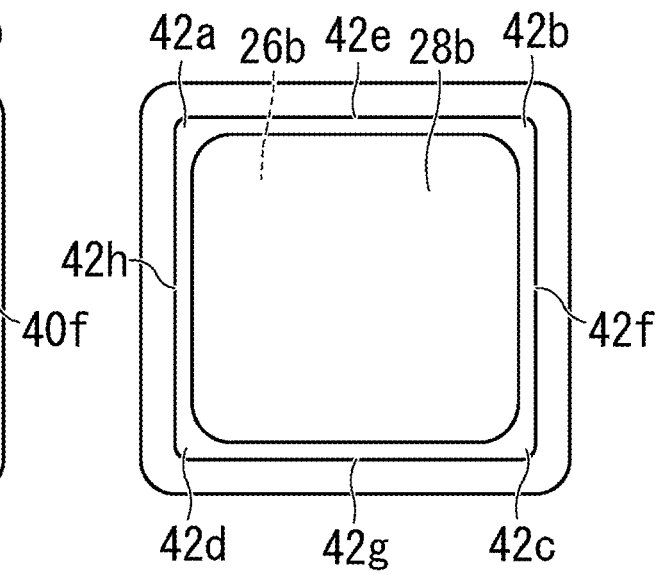
FIG. 6B is a view illustrating an example of the shape in the case where a second connecting portion is on corner portions and ridge line portions in a multilayer ceramic capacitor according to a preferred embodiment of the present invention.
Figure 7A:
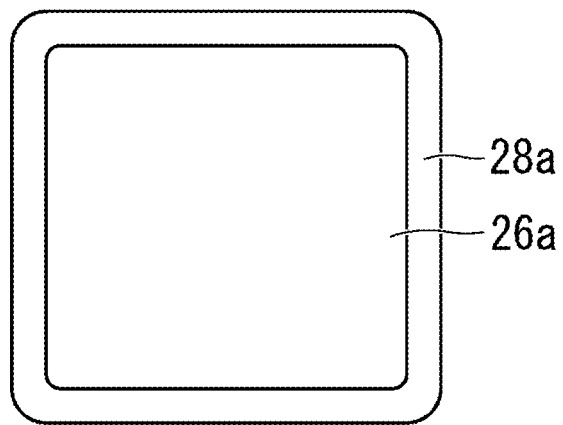
FIG. 7A is a view illustrating an example of the shape in the case where a first connecting portion is over the entire surface of a first underlying electrode layer in a multilayer ceramic capacitor according to a preferred embodiment of the present invention.
Figure 7B:
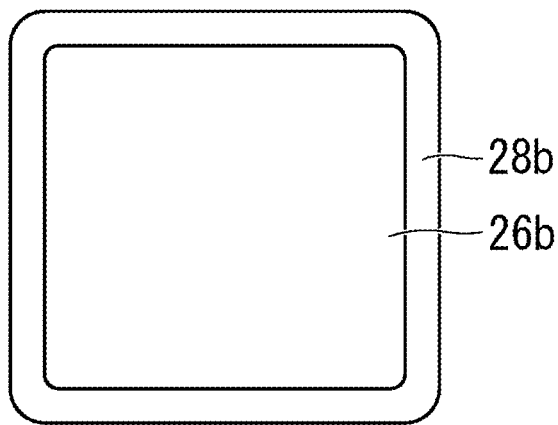
FIG. 7B is a view illustrating an example of the shape in the case where a second connecting portion is over the entire surface of a second underlying electrode layer in a multilayer ceramic capacitor according to a preferred embodiment of the present invention.

The shape of the connecting portion 36 will be described with reference to FIGS. 5A to 7B. FIG. 5A is a view illustrating an example of the shape in the case where a first connecting portion is at corner portions of a first underlying electrode layer in a multilayer ceramic capacitor according to the present invention. FIG. 5B is a view illustrating an example of the shape in the case where a second connecting portion is at corner portions of a second underlying electrode layer in a multilayer ceramic capacitor according to the present invention. FIG. 6A is a view illustrating an example of the shape in the case where a first connecting portion is on corner portions and ridge line portions of a first underlying electrode layer in a multilayer ceramic capacitor according to the present invention. FIG. 6B is a view illustrating an example of the shape in the case where a second connecting portion is on corner portions and ridge line portions of a second underlying electrode layer in a multilayer ceramic capacitor according to the present invention. FIG. 7A is a view illustrating an example of the shape in the case where a first connecting portion is over the entire surface of a first underlying electrode layer in a multilayer ceramic capacitor according to the present invention. FIG. 7B is a view illustrating an example of the shape in the case where a second connecting portion is over the entire surface of a second underlying electrode layer in a multilayer ceramic capacitor according to the present invention.

The first conductive resin layer 28a is on the first underlying electrode layer 26a such that the first underlying electrode layer 26a is exposed at, among four corner portions 40a, 40b, 40c, and 40d of the first underlying electrode layer 26a on the side opposing the multilayer body 12, the corner portions being illustrated in FIG. 5A, at least one of the corner portions 40a, 40b, 40c, and 40d. The second conductive resin layer 28b is on the second underlying electrode layer 26b such that the second underlying electrode layer 26b is exposed at, among four corner portions 42a, 42b, 42c, and 42d of the second underlying electrode layer 26b on the side opposing the multilayer body 12, the corner portions being illustrated in FIG. 5B, at least one of the corner portions 42a, 42b, 42c, and 42d.

Accordingly, the first outer electrode 24a can be provided in a state where the first plating layer 30a described below is in direct contact with the first underlying electrode layer 26a without the first conductive resin layer 28a, which has a high resistivity, interposed therebetween at at least one of the four corner portions 40a, 40b, 40c, and 40d of the first underlying electrode layer 26a on the side opposing the multilayer body 12. The second outer electrode 24b can be provided in a state where the second plating layer 30b described below is in direct contact with the second underlying electrode layer 26b without the second conductive resin layer 28b, which has a high resistivity, interposed therebetween at at least one of the four corner portions 42a, 42b, 42c, and 42d of the second underlying electrode layer 26b on the side opposing the multilayer body 12. Therefore, the first outer electrode 24a and the second outer electrode 24b can have a reduced equivalent series resistance (ESR).

The first outer electrode 24a is preferably provided in a state where the first plating layer 30a is in direct contact with the first underlying electrode layer 26a without the first conductive resin layer 28a interposed therebetween at all the four corner portions 40a, 40b, 40c, and 40d of the first underlying electrode layer 26a on the side opposing the multilayer body 12, the corner portions being illustrated in FIG. 5A. The second outer electrode 24b is preferably provided in a state where the second plating layer 30b is in direct contact with the second underlying electrode layer 26b without the second conductive resin layer 28b interposed therebetween at all the four corner portions 42a, 42b, 42c, and 42d of the second underlying electrode layer 26b on the side opposing the multilayer body 12, the corner portions being illustrated in FIG. 5B.

With this structure, the first outer electrode 24a can be provided in a state where the first plating layer 30a is in direct contact with the first underlying electrode layer 26a without the first conductive resin layer 28a, which has a high resistivity, interposed therebetween at all the four corner portions 40a, 40b, 40c, and 40d of the first underlying electrode layer 26a on the side opposing the multilayer body 12. The second outer electrode 24b can be provided in a state where the second plating layer 30b is in direct contact with the second underlying electrode layer 26b without the second conductive resin layer 28b, which has a high resistivity, interposed therebetween at all the four corner portions 42a, 42b, 42c, and 42d of the second underlying electrode layer 26b on the side opposing the multilayer body 12. Therefore, the first outer electrode 24a and the second outer electrode 24b can have a reduced equivalent series resistance (ESR).

Furthermore, the first outer electrode 24a is preferably provided in a state where the first plating layer 30a is in direct contact with the first underlying electrode layer 26a without the first conductive resin layer 28a interposed therebetween in a peripheral portion 44a that is illustrated in FIG. 6A and that includes all four corner portions 40a, 40b, 40c, and 40d and four ridge line portions 40e, 40f, 40g, and 40h of the first underlying electrode layer 26a on the side opposing the multilayer body 12. The second outer electrode 24b is preferably provided in a state where the second plating layer 30b is in direct contact with the second underlying electrode layer 26b without the second conductive resin layer 28b interposed therebetween in a peripheral portion 44b that is illustrated in FIG. 6B and that includes all four corner portions 42a, 42b, 42c, and 42d and four ridge line portions 42e, 42f, 42g, and 42h of the second underlying electrode layer 26b on the side opposing the multilayer body 12.

With this structure, the first outer electrode 24a can be provided in a state where the first plating layer 30a is in direct contact with the first underlying electrode layer 26a without the first conductive resin layer 28a, which has a high resistivity, interposed therebetween in the peripheral portion 44a that includes all the four corner portions 40a, 40b, 40c, and 40d and the four ridge line portions 40e, 40f, 40g, and 40h of the first underlying electrode layer 26a on the side opposing the multilayer body 12. The second outer electrode 24b can be provided in a state where the second plating layer 30b is in direct contact with the second underlying electrode layer 26b without the second conductive resin layer 28b, which has a high resistivity, interposed therebetween in the peripheral portion 44b that includes all the four corner portions 42a, 42b, 42c, and 42d and the four ridge line portions 42e, 42f, 42g, and 42h of the second underlying electrode layer 26b on the side opposing the multilayer body 12. Therefore, the first outer electrode 24a and the second outer electrode 24b can have a further reduced equivalent series resistance (ESR).

Furthermore, the first outer electrode 24a is preferably provided in a state where the first plating layer 30a is in direct contact with the first underlying electrode layer 26a without the first conductive resin layer 28a interposed therebetween on a surface of the first underlying electrode layer 26a, the surface opposing the multilayer body 12 and being illustrated in FIG. 7A. The second outer electrode 24b is preferably provided in a state where the second plating layer 30b is in direct contact with the second underlying electrode layer 26b without the second conductive resin layer 28b interposed therebetween on a surface of the second underlying electrode layer 26b, the surface opposing the multilayer body 12 and being illustrated in FIG. 7B.

With this structure, the first outer electrode 24a can be provided in a state where the first plating layer 30a is in direct contact with the first underlying electrode layer 26a without the first conductive resin layer 28a, which has a high resistivity, interposed therebetween on the surface of the first underlying electrode layer 26a, the surface opposing the multilayer body 12. The second outer electrode 24b can be provided in a state where the second plating layer 30b is in direct contact with the second underlying electrode layer 26b without the second conductive resin layer 28b, which has a high resistivity, interposed therebetween on the surface of the second underlying electrode layer 26b, the surface opposing the multilayer body 12. Therefore, strong electrical connection between the first underlying electrode layer 26a and the first plating layer 30a and between the second underlying electrode layer 26b and the second plating layer 30b can be established. Thus, the first outer electrode 24a and the second outer electrode 24b can have a further reduced equivalent series resistance (ESR).

Figure 8A:
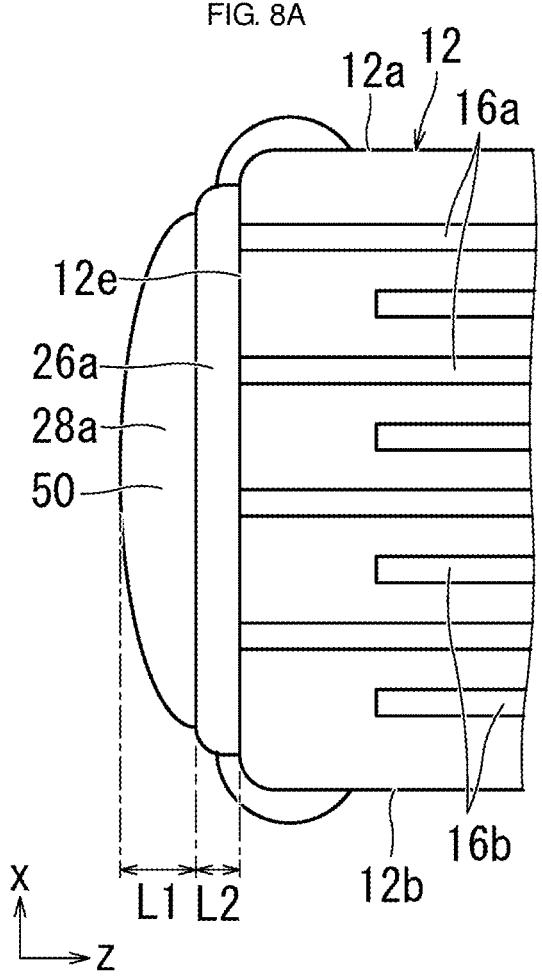
FIG. 8A is a view illustrating a first region in a multilayer ceramic capacitor according to a preferred embodiment of the present invention.

In addition, as illustrated in FIG. 8A, in a first region 50 between the first plating layer 30a and the inner side of the four corner portions 40a, 40b, 40c, and 40d and the ridge line portions 40e, 40f, 40g, and 40h of the surface of the first underlying electrode layer 26a, the surface opposing the first end surface 12e, a thickness L1 of a central portion in the stacking direction x in the first region 50 is preferably larger than a thickness L2 of the first underlying electrode layer 26a. When the thickness L1 of the central portion in the stacking direction x in the first region 50 is larger than the thickness L2 of the first underlying electrode layer 26a, a resistance value can be efficiently increased without significantly increasing the length L of the multilayer ceramic capacitor in the length direction, and a current can be led to the first connecting potion 36a between the first underlying electrode layer 26a and the first plating layer 30a.

Figure 8B:
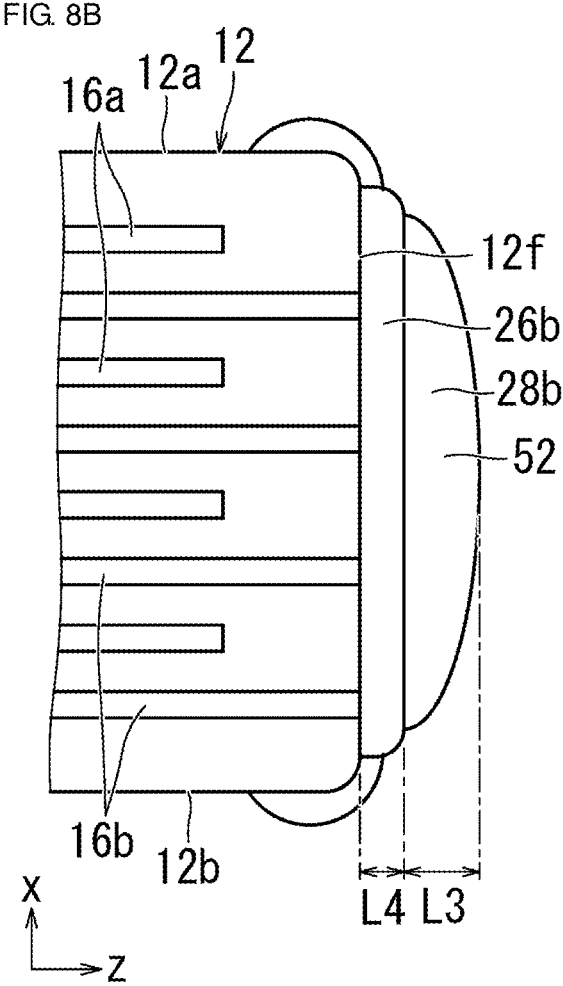
FIG. 8B is a view illustrating a second region in a multilayer ceramic capacitor according to a preferred embodiment of the present invention.

Similarly, as illustrated in FIG. 8B, in a second region 52 between the second plating layer 30b and the inner side of the four corner portions 42a, 42b, 42c, and 42d and the ridge line portions 42e, 42f, 42g, and 42h of the surface of the second underlying electrode layer 26b, the surface opposing the second end surface 12f, a thickness L3 of a central portion in the stacking direction x in the second region 52 is preferably larger than a thickness L4 of the second underlying electrode layer 26b. When the thickness L3 of the central portion in the stacking direction x in the second region 52 is larger than the thickness L4 of the second underlying electrode layer 26b, a resistance value can be efficiently increased without significantly increasing the length L of the multilayer ceramic capacitor in the length direction, and a current can be led to the second connecting potion 36b between the second underlying electrode layer 26b and the second plating layer 30b.

The first conductive resin layer 28a and the second conductive resin layer 28b preferably include a thermosetting resin and a metal.

Examples of the thermosetting resin of the first conductive resin layer 28a and the second conductive resin layer 28b preferably include, for example, various known thermosetting resins such as epoxy resins, phenolic resins, urethane resins, silicone resins, and polyimide resins. Of these, epoxy resins, which are good in terms of, for example, heat resistance, moisture resistance, and adhesiveness, are the most preferable resins.

The first conductive resin layer 28a and the second conductive resin layer 28b preferably include the thermosetting resin in an amount of, for example, about 25% by volume or more and about 65% by volume or less relative to the total volume of conductive resins.

The first conductive resin layer 28a and the second conductive resin layer 28b preferably include a curing agent along with the thermosetting resin. In the case where an epoxy resin is used as a base resin, any of various known compounds such as, for example, phenolic compounds, amine compounds, acid anhydride compounds, and imidazole compounds can be used as the curing agent for the epoxy resin.

The metal included in the first conductive resin layer 28a and the second conductive resin layer 28b is mainly responsible for the electrical conductivity of the first conductive resin layer 28a and the second conductive resin layer 28b. Specifically, electrically conductive paths are provided inside the first conductive resin layer 28a and the second conductive resin layer 28b as a result of metal particles included in the first conductive resin layer 28a and the second conductive resin layer 28b contacting each other.

The shape of the metal included in the first conductive resin layer 28a and the second conductive resin layer 28b is not particularly limited. The metal included in the first conductive resin layer 28a and the second conductive resin layer 28b may have, for example, a substantially spherical or flat shape. However, it is preferable to use a mixture of a substantially spherical metal powder and a substantially flat metal powder. The average particle size of the metal included in the first conductive resin layer 28a and the second conductive resin layer 28b is not particularly limited. The average particle size of the metal included in the first conductive resin layer 28a and the second conductive resin layer 28b may preferably be, for example, about 0.3 μm or more and about 10 μm or less.

For example, as the metal included in the first conductive resin layer 28a and the second conductive resin layer 28b, Ag, Cu, or an alloy thereof can preferably be used. A metal powder having a surface coated with Ag can also be used. When a metal powder having a surface coated with Ag is used, Cu or Ni is preferably used as the material of the metal powder. A substance obtained by subjecting Cu to an oxidation-resistant treatment can also be used.

The reason why a conductive metal powder made of Ag is used as the metal of the first conductive resin layer 28a and the second conductive resin layer 28b is as follows. Silver (Ag) has the lowest resistivity in metals and thus is suitable for an electrode material, and Ag is a noble metal and thus is not oxidized and has high weather resistance. The reason for the use of a metal coated with Ag is that a cheap metal can be used as a base metal while maintaining the above-described characteristics of Ag.

The first conductive resin layer 28a and the second conductive resin layer 28b preferably include the metal in an amount of, for example, about 35% by volume or more and about 75% by volume or less relative to the total volume of the conductive resins.

The thickness of each of the first conductive resin layer 28a and the second conductive resin layer 28b at a central portion in the stacking direction x of the multilayer body 12 is preferably, for example, about 10 μm or more and about 40 μm or less. The thickness of each of the first conductive resin layer 28a and the second conductive resin layer 28b at a central portion in the length direction z of the first conductive resin layer 28a and the second conductive resin layer 28b, the first conductive resin layer 28a and the second conductive resin layer 28b being located on the first main surface 12a, the second main surface 12b, the first side surface 12c, and the second side surface 12d, is preferably, for example, about 10 μm or more and about 200 μm or less.

The first conductive resin layer 28a and the second conductive resin layer 28b preferably include a thermosetting resin and thus have higher flexibility than the first underlying electrode layer 26a and the second underlying electrode layer 26b each of which is formed of, for example, a plating film or a sintered product of a conductive paste. Therefore, even when a physical impact or a shock resulting from a heat cycle is applied to the multilayer ceramic capacitor 10, the first conductive resin layer 28a and the second conductive resin layer 28b function as buffer layers, and the multilayer ceramic capacitor 10 can be prevented from cracking.

Lower Plating Layer

A lower plating layer 30 preferably includes a first plating layer 30a and a second plating layer 30b. The first plating layer 30a is on the first end surface 12e side of the multilayer body 12 and covers the first underlying electrode layer 26a and the first conductive resin layer 28a. The second plating layer 30b is on the second end surface 12f side of the multilayer body 12 and covers the second underlying electrode layer 26b and the second conductive resin layer 28b.

The first plating layer 30a and the second plating layer 30b preferably include at least one selected from, for example, Cu, Ni, Ag, Pd, Ag—Pd alloys, and Au. The first plating layer 30a and the second plating layer 30b are preferably defined by Ni plating. By forming the first plating layer 30a and the second plating layer 30b by Ni plating, the first underlying electrode layer 26a and the second underlying electrode layer 26b can be prevented from being eroded by solder when the multilayer ceramic capacitor 10 is mounted.

The first underlying electrode layer 26a and the first plating layer 30a each preferably have a higher electrical conductivity than the first conductive resin layer 28a. The second underlying electrode layer 26b and the second plating layer 30b each preferably have a higher electrical conductivity than the second conductive resin layer 28b. In this case, electrical conduction from the first underlying electrode layer 26a to the first plating layer 30a and electrical conduction from the second underlying electrode layer 26b to the second plating layer 30b are easily established, and the equivalent series resistance (ESR) can be further reduced.

The thickness of each of the first plating layer 30a and the second plating layer 30b is preferably about 2 μm or more and about 6 μm or less.

An upper plating layer 32 preferably includes a third plating layer 32a and a fourth plating layer 32b. The third plating layer 32a is on the first end surface 12e side of the multilayer body 12 and covers the first plating layer 30a. The fourth plating layer 32b is on the second end surface 12f side of the multilayer body 12 and covers the second plating layer 30b.

The third plating layer 32a and the fourth plating layer 32b preferably include at least one selected from, for example, Sn, Ag, Pd, Ag—Pd alloys, and Au. The third plating layer 32a and the fourth plating layer 32b may each be made of a plurality of layers. The third plating layer 32a and the fourth plating layer 32b are preferably formed by Sn plating, for example. By forming the third plating layer 32a and the fourth plating layer 32b by Sn plating, the wettability of solder is improved when the multilayer ceramic capacitor 10 is mounted, and the multilayer ceramic capacitor 10 can be easily mounted.

The thickness of the third plating layer 32a and the fourth plating layer 32b is preferably about 2 μm or more and about 6 μm or less per layer, for example.

A dimension of the multilayer ceramic capacitor 10 including the multilayer body 12 and the outer electrode 24 in the length direction z is represented by an L-dimension. The L-dimension is preferably about 0.6 mm or more and about 5.7 mm or less, for example. A dimension of the multilayer ceramic capacitor 10 including the multilayer body 12 and the outer electrode 24 in the width direction y is represented by a W-dimension. The W-dimension is preferably about 0.3 mm or more and about 5.0 mm or less, for example. A dimension of the multilayer ceramic capacitor 10 including the multilayer body 12 and the outer electrode 24 in the stacking direction x is represented by a T-dimension. The T-dimension is preferably about 0.3 mm or more and about 3.0 mm or less, for example.

Advantages

The first outer electrode 24a is provided in a state where the first plating layer 30a is in direct contact with the first underlying electrode layer 26a without the first conductive resin layer 28a, which has a high resistivity, interposed therebetween at at least one of the four corner portions 40a, 40b, 40c, and 40d of the first underlying electrode layer 26a on the side opposing the multilayer body 12. The second outer electrode 24b is provided in a state where the second plating layer 30b is in direct contact with the second underlying electrode layer 26b without the second conductive resin layer 28b, which has a high resistivity, interposed therebetween at at least one of the four corner portions 42a, 42b, 42c, and 42d of the second underlying electrode layer 26b on the side opposing the multilayer body 12. With this structure, the first outer electrode 24a and the second outer electrode 24b can have a reduced equivalent series resistance (ESR).

The first outer electrode 24a is provided in a state where the first plating layer 30a is in direct contact with the first underlying electrode layer 26a without the first conductive resin layer 28a, which has a high resistivity, interposed therebetween at all the four corner portions 40a, 40b, 40c, and 40d of the first underlying electrode layer 26a on the side opposing the multilayer body 12. The second outer electrode 24b is provided in a state where the second plating layer 30b is in direct contact with the second underlying electrode layer 26b without the second conductive resin layer 28b, which has a high resistivity, interposed therebetween at all the four corner portions 42a, 42b, 42c, and 42d of the second underlying electrode layer 26b on the side opposing the multilayer body 12. With this structure, the first outer electrode 24a and the second outer electrode 24b can have a reduced equivalent series resistance (ESR).

Furthermore, the first outer electrode 24a is provided in a state where the first plating layer 30a is in direct contact with the first underlying electrode layer 26a without the first conductive resin layer 28a, which has a high resistivity, interposed therebetween in the peripheral portion 44a that includes all the four corner portions 40a, 40b, 40c, and 40d and the four ridge line portions of the first underlying electrode layer 26a on the side opposing the multilayer body 12. The second outer electrode 24b is provided in a state where the second plating layer 30b is in direct contact with the second underlying electrode layer 26b without the second conductive resin layer 28b, which has a high resistivity, interposed therebetween in the peripheral portion 44b that includes all the four corner portions 42a, 42b, 42c, and 42d and the four ridge line portions of the second underlying electrode layer 26b on the side opposing the multilayer body 12. With this structure, the first outer electrode 24a and the second outer electrode 24b can have a further reduced equivalent series resistance (ESR).

Furthermore, the first outer electrode 24a is provided in a state where the first plating layer 30a is in direct contact with the first underlying electrode layer 26a without the first conductive resin layer 28a, which has a high resistivity, interposed therebetween on a surface of the first underlying electrode layer 26a, the surface opposing the multilayer body 12. The second outer electrode 24b is provided in a state where the second plating layer 30b is in direct contact with the second underlying electrode layer 26b without the second conductive resin layer 28b, which has a high resistivity, interposed therebetween on a surface of the second underlying electrode layer 26b, the surface opposing the multilayer body 12. With this structure, the first outer electrode 24a and the second outer electrode 24b can have a further reduced equivalent series resistance (ESR).

In the first region 50 between the first plating layer 30a and the inner side of the four corner portions 40a, 40b, 40c, and 40d and the ridges lines 40e, 40f, 40g, and 40h of a surface of the first underlying electrode layer 26a, the surface opposing the first end surface 12e, the thickness L1 of the central portion in the stacking direction x in the first region 50 is larger than the thickness L2 of the first underlying electrode layer 26a. With this structure, the resistance value can be efficiently increased without significantly increasing the length L of the multilayer ceramic capacitor 10 in the length direction, and a current can be led to the first connecting potion 36a between the first underlying electrode layer 26a and the first plating layer 30a.

Similarly, in the second region 52 between the second plating layer 30b and the inner side of the four corner portions 42a, 42b, 42c, and 42d and the ridge line portions 42e, 42f, 42g, and 42h of a surface of the second underlying electrode layer 26b, the surface opposing the second end surface 12f, the thickness L3 of the central portion in the stacking direction x in the second region 52 is larger than the thickness L4 of the second underlying electrode layer 26b. With this structure, the resistance value can be efficiently increased without significantly increasing the length L of the multilayer ceramic capacitor 10 in the length direction, and a current can be guided to the second connecting potion 36b between the second underlying electrode layer 26b and the second plating layer 30b.

2. Method for Producing Multilayer Ceramic Electronic Component

Next, a non-limiting example of a method for producing a multilayer ceramic electronic component according to a preferred embodiment of the present invention will be described. In the present preferred embodiment, a multilayer ceramic capacitor 10 will be described as an example of the multilayer ceramic electronic component. However, the multilayer ceramic electronic component is not limited to a multilayer ceramic capacitor.

First, ceramic green sheets are formed by applying a ceramic paste including a ceramic powder by, for example, screen printing, and drying the ceramic paste.

Next, a conductive paste used in forming inner electrodes is applied to some of the ceramic green sheets in a predetermined pattern by, for example, screen printing. Thus, ceramic green sheets on which inner-electrode conductive patterns are formed and ceramic green sheets on which no inner-electrode conductive patterns are formed are prepared. The ceramic paste and the conductive paste used in forming the inner electrodes may include, for example, a known binder or solvent.

Next, a mother multilayer body is formed by stacking a predetermined number of ceramic green sheets on which no inner-electrode conductive patterns are formed, ceramic green sheets on which the inner-electrode conductive patterns are formed, and a predetermined number of ceramic green sheets on which no inner-electrode conductive patterns are formed, in that order.

The mother multilayer body may be pressed in the stacking direction by a method such as, for example, isostatic pressing, if necessary.

The mother multilayer body is cut into a plurality of green multilayer bodies with a predetermined shape and predetermined dimensions. In this operation, corner portions and ridge line portions of multilayer bodies 12 may be formed by subjecting the green multilayer bodies to barrel polishing or the like, for example.

The green multilayer bodies are fired to complete multilayer bodies 12. Each of the multilayer bodies 12 includes first inner electrode layers 16a and second inner electrode layers 16b therein, and end portions of the first inner electrode layers 16a and second inner electrode layers 16b are extended to a first end surface 12e or a second end surface 12f of the multilayer body 12. The firing temperature of the green multilayer bodies may be appropriately set in accordance with the ceramic materials and conductive materials used. The firing temperature of the green multilayer bodies may preferably be, for example, about 900° C. or higher and about 1,300° C. or lower.

A conductive paste used in forming a first underlying electrode layer 26a and a second underlying electrode layer 26b is applied to the first end surface 12e and the second end surface 12f of each of the multilayer bodies after firing and baked to form the first underlying electrode layer 26a and the second underlying electrode layer 26b. The baking temperature is preferably about 700° C. or higher and about 900° C. or lower, for example. As the method of applying the conductive paste used in forming the first underlying electrode layer 26a and the second underlying electrode layer 26b, for example, plating, screen printing, a dipping technique, or the like can be employed.

Next, a first conductive resin layer 28a and a second conductive resin layer 28b are formed to cover the first underlying electrode layer 26a and the second underlying electrode layer 26b, respectively. As the method used in forming the first conductive resin layer 28a and the second conductive resin layer 28b, for example, screen printing, a dipping technique, or the like can be employed.

Next, each of the multilayer bodies on which the first conductive resin layer 28a and the second conductive resin layer 28b are formed is subjected to barrel polishing or the like to form connecting potions 36 (corner portions 40a, 40b, 40c, 40d, 42a, 42b, 42c, and 42d, ridge line portions 40e, 40f, 40g, 40h, 42e, 42f, 42g, and 42h, and peripheral portions 44a and 44b).

In the formation of the first conductive resin layer 28a and the second conductive resin layer 28b, examples of a method for forming the first conductive resin layer 28a and the second conductive resin layer 28b on the connecting potions 36 to have small thicknesses include the following three methods. By forming the first conductive resin layer 28a and the second conductive resin layer 28b on the connecting potions 36 to have small thicknesses, the connecting potions 36 can be easily formed by barrel polishing or the like.

(1) The viscosity of the conductive paste used for forming the first conductive resin layer 28a and the second conductive resin layer 28b is decreased by adding a solvent. By decreasing the viscosity of the conductive paste used for forming the first conductive resin layer 28a and the second conductive resin layer 28b, the first conductive resin layer 28a and the second conductive resin layer 28b can be formed to have small thicknesses on the corner portions or the ridge line portions of the first underlying electrode layer 26a and the second underlying electrode layer 26b.

(2) The yield value of the first conductive resin layer 28a and the second conductive resin layer 28b is decreased by decreasing the specific surface area of a metal powder. By decreasing the yield value of the first conductive resin layer 28a and the second conductive resin layer 28b, the first conductive resin layer 28a and the second conductive resin layer 28b can be formed to have small thicknesses on the corner portions or the ridge line portions of the first underlying electrode layer 26a and the second underlying electrode layer 26b.

(3) In the case where the first conductive resin layer 28a and the second conductive resin layer 28b are produced by applying a conductive paste by a dipping technique, the multilayer ceramic capacitor 10 is slowly pulled up after being dipped in the conductive paste used in forming the first conductive resin layer 28a and the second conductive resin layer 28b. By slowly pulling up the multilayer ceramic capacitor 10 after being dipped in the conductive paste used in forming the first conductive resin layer 28a and the second conductive resin layer 28b, the first conductive resin layer 28a and the second conductive resin layer 28b can be formed to have small thicknesses on the corner portions or the ridge line portions of the first underlying electrode layer 26a and the second underlying electrode layer 26b.

Examples of the method for forming the connecting potions 36 by subjecting the multilayer ceramic capacitor 10 on which the first conductive resin layer 28a and the second conductive resin layer 28b are formed to barrel polishing or the like include the following two methods.

(A) By placing media and the multilayer ceramic capacitor 10 and performing a barrel treatment, the first conductive resin layer 28a and the second conductive resin layer 28b formed on the corner portions or the ridge line portions of the first underlying electrode layer 26a and the second underlying electrode layer 26b are ground.

(B) By a stress due to barreling in a plating step, the first conductive resin layer 28a and the second conductive resin layer 28b formed on the corner portions or the ridge line portions of the first underlying electrode layer 26a and the second underlying electrode layer 26b are ground.

Next, a first plating layer 30a and a second plating layer 30b are formed on the first underlying electrode layer 26a and the second underlying electrode layer 26b and the first conductive resin layer 28a and the second conductive resin layer 28b. The first plating layer 30a and the second plating layer 30b are formed by, for example, electrolytic plating, electroless plating, or the like.

Next, a third plating layer 32a and a fourth plating layer 32b are formed on the first plating layer 30a and the second plating layer 30b, respectively. The third plating layer 32a and the fourth plating layer 32b are formed by, for example, electrolytic plating, electroless plating, or the like.

As described above, the multilayer ceramic capacitor 10 according to the present preferred embodiment is produced.

The first underlying electrode layer 26a and the first plating layer 30a are directly joined to each other in the first connecting portion 36a. The second underlying electrode layer 26b and the second plating layer 30b are directly joined to each other in the second connecting potion 36b. Accordingly, the first underlying electrode layer 26a and the first plating layer 30a are joined to each other without the first conductive resin layer 28a, which has a high resistance, therebetween, and the second underlying electrode layer 26b and the second plating layer 30b are joined to each other without the second conductive resin layer 28b, which has a high resistance, therebetween. Therefore, the outer electrode 24 can have a reduced equivalent series resistance (ESR) as a whole.

3. Modification

Figure 9:
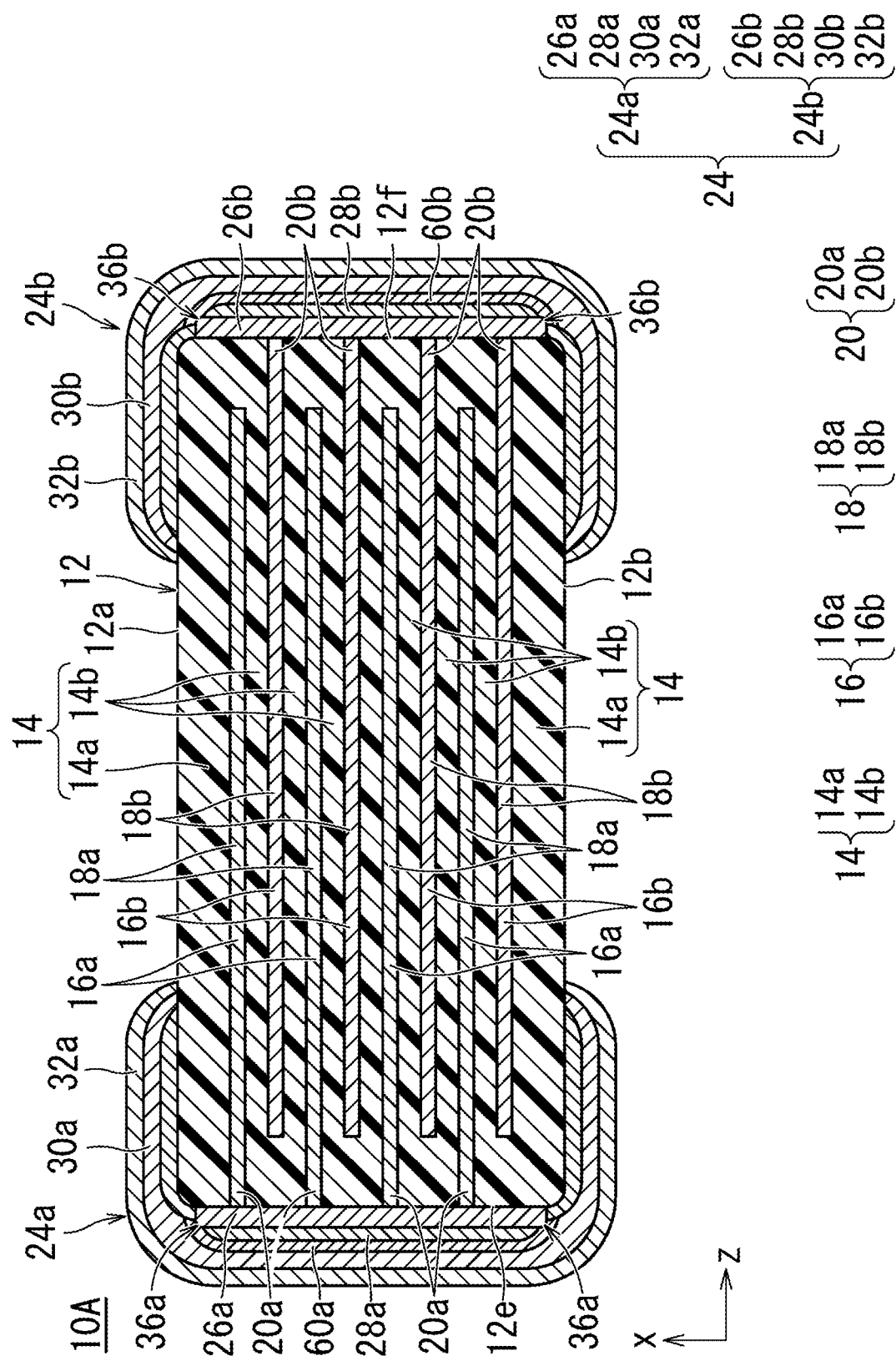
FIG. 9 is a view of an L-T section made by cutting a multilayer ceramic capacitor which is a modification of a preferred embodiment of the present invention at a position of ½ with respect to a length in a width direction.

A multilayer ceramic electronic component 10A which is a modification of a preferred embodiment of the present invention will be described with reference to FIG. 9. In the present preferred embodiment, a multilayer ceramic capacitor 10A will be described as an example of the multilayer ceramic electronic component. However, the multilayer ceramic electronic component is not limited to a multilayer ceramic capacitor. FIG. 9 is a view of an L-T section made by cutting the multilayer ceramic capacitor 10A which is a modification of the present invention at a position of ½ with respect to a length in a width direction. The multilayer ceramic capacitor 10A which is a modification of a preferred embodiment of the present invention differs from the multilayer ceramic electronic component 10 in that the multilayer ceramic capacitor 10A preferably includes a first conductive portion 60a between the first underlying electrode layer 26a and the first plating layer 30a, and a second conductive portion 60b between the second underlying electrode layer 26b and the second plating layer 30b. The first conductive portion 60a and the second conductive portion 60b are formed by a dipping technique, screen printing, or the like.

First Conductive Portion and Second Conductive Portion

The first conductive portion 60a is between the first underlying electrode layer 26a and the first plating layer 30a, and the second conductive portion 60b is between the second underlying electrode layer 26b and the second plating layer 30b. The first conductive portion 60a and the second conductive portion 60b are preferably made using a material having a higher electrical conductivity than the first conductive resin layer 28a and the second conductive resin layer 28b. The electrical conductivity of the first conductive portion 60a and the second conductive portion 60b can be increased by, for example, mixing a low-melting-point metal or increasing the degree of blending of a filler.

By providing the first conductive portion 60a and the second conductive portion 60b, which have a high electrical conductivity, between the first underlying electrode layer 26a and the first plating layer 30a and between the second underlying electrode layer 26b and the second plating layer 30b, the first plating layer 30a and the second plating layer 30b can be provided in a state of being in contact with the first underlying electrode layer 26a and the second underlying electrode layer 26b without the first conductive resin layer 28a and the second conductive resin layer 28b, which have a high resistivity, interposed therebetween. Therefore, the first outer electrode 24a and the second outer electrode 24b can have a reduced equivalent series resistance (ESR).

The first conductive portion 60a and the second conductive portion 60b each preferably include a metal and a resin.

The metal used in the first conductive portion 60a and the second conductive portion 60b is preferably, for example, Ni, Ag, Cu, Sn, In, or Bi or an alloy containing at least one of these metals.

The metal used in the first conductive portion 60a is preferably the metal used in the first underlying electrode layer 26a, the metal used in the first plating layer 30a, or an alloy including the metals. The metal used in the second conductive portion 60b is preferably the metal used in the second underlying electrode layer 26b, the metal used in the second plating layer 30b, or an alloy including the metals.

The resin used in the first conductive portion 60a and the second conductive portion 60b is preferably, for example, a thermosetting resin such as an epoxy resin or a phenolic resin.

The first conductive portion 60a and the second conductive portion 60b each preferably have a thickness of about 10 μm or more and about 40 μm or less, for example.

When the metal used in the first underlying electrode layer 26a, the metal used in the first plating layer 30a, or an alloy formed of the metals is used as the metal in the first conductive portion 60a, a joining property with at least one of the first underlying electrode layer 26a or the first plating layer 30a is enhanced. When the metal used in the second underlying electrode layer 26b, the metal used in the second plating layer 30b, or an alloy formed of the metals is used as the metal in the second conductive portion 60b, a joining property with at least one of the second underlying electrode layer 26b or the second plating layer 30b is enhanced. Consequently, electrical conduction between the first underlying electrode layer 26a and the first plating layer 30a and between the second underlying electrode layer 26b and the second plating layer 30b enhances. Thus, the first outer electrode 24a and the second outer electrode 24b can have a reduced equivalent series resistance (ESR).

A method for producing a multilayer ceramic electronic component 10A which is a modification of a preferred embodiment of the present invention will be described. In the present preferred embodiment, a multilayer ceramic capacitor 10A will be described as an example of the multilayer ceramic electronic component. However, the multilayer ceramic electronic component is not limited to a multilayer ceramic capacitor. The multilayer ceramic capacitor 10A which is a modification of the present invention differs from the multilayer ceramic electronic component 10 of the present invention in that the multilayer ceramic capacitor 10A includes a first conductive portion 60a between the first conductive resin layer 28a and the first plating layer first plating layer 30a, and a second conductive portion 60b between the second conductive resin layer 28b and the second plating layer 30b.

In the production method described above, after the first conductive resin layer 28a and the second conductive resin layer 28b are formed and at least one corner portion is preferably formed by barrel polishing, the first conductive portion 60a and the second conductive portion 60b are formed by a dipping technique, screen printing, or the like, for example.

Next, a first plating layer 30a and a second plating layer 30b are preferably formed by plating or the like, for example. A third plating layer 32a and a fourth plating layer 32b are preferably formed to cover the first plating layer 30a and the second plating layer 30b, respectively. Thus, the multilayer ceramic capacitor 10A is produced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component, comprising:
    a multilayer body including a plurality of stacked ceramic layers and including a first main surface and a second main surface that are opposite to each other in a stacking direction, a first side surface and a second side surface that are opposite to each other in a width direction orthogonal or substantially orthogonal to the stacking direction, and a first end surface and a second end surface that are opposite to each other in a length direction orthogonal or substantially orthogonal to the stacking direction and the width direction;
    a plurality of first inner electrode layers stacked alternately with the plurality of ceramic layers and exposed at the first end surface;
    a plurality of second inner electrode layers stacked alternately with the plurality of ceramic layers and exposed at the second end surface;
    a first outer electrode connected to the first inner electrode layers and disposed on the first end surface; and
    a second outer electrode connected to the second inner electrode layers and disposed on the second end surface; wherein
    the first outer electrode includes:
        a first underlying electrode layer connected to the first inner electrode layers and disposed on the first end surface;
        a first conductive resin layer covering the first underlying electrode layer; and a first plating layer covering the first conductive resin layer;

the second outer electrode includes:
a second underlying electrode layer connected to the second inner electrode layers and disposed on the second end surface;
a second conductive resin layer covering the second underlying electrode layer; and
a second plating layer covering the second conductive resin layer;

the first underlying electrode layer is joined to the first plating layer without the first conductive resin layer interposed therebetween only in a first connecting portion on corner portions and ridge line portions of a surface opposing the first end surface; and the second underlying electrode layer is joined to the second plating layer without the second conductive resin layer interposed therebetween only in a second connecting portion on corner portions and ridge line portions of a surface opposing the second end surface.

2. The multilayer ceramic electronic component according to claim 1, wherein the first underlying electrode layer and the second underlying electrode layer do not include a glass component.

3. The multilayer ceramic electronic component according to claim 1, wherein
the first underlying electrode layer and the first plating layer each have a higher electrical conductivity than the first conductive resin layer; and
the second underlying electrode layer and the second plating layer each have a higher electrical conductivity than the second conductive resin layer.

4. The multilayer ceramic electronic component according to claim 1, wherein
in a first region between the first plating layer and an inner side of the first connecting portion on four of the corner portions and the ridge line portions of the surface of the first underlying electrode layer, a thickness of a central portion in the stacking direction in the first region is larger than a thickness of the first underlying electrode layer; and
in a second region between the second plating layer and an inner side of the second connecting portion on four of the corner portions and the ridge line portions of the surface of the second underlying electrode layer, a thickness of a central portion in the stacking direction in the second region is larger than a thickness of the second underlying electrode layer.

5. The multilayer ceramic electronic component according to claim 4, wherein the first conductive resin layer is not present in the first region, and the second conductive resin layer is not present in the second region.

6. The multilayer ceramic electronic component according to claim 1, wherein
in the first connecting portion, a first conductive portion is between the first underlying electrode layer and the first plating layer, and an electrical conductivity of the first conductive portion is higher than an electrical conductivity of the first conductive resin layer; and
in the second connecting portion, a second conductive portion is between the second underlying electrode layer and the second plating layer, and an electrical conductivity of the second conductive portion is higher than an electrical conductivity of the second conductive resin layer.

7. The multilayer ceramic electronic component according to claim 6, wherein a metal used in the first conductive portion is a metal used in the first underlying electrode layer, a metal used in the first plating layer, or an alloy of the metals; and
a metal used in the second conductive portion is a metal used in the second underlying electrode layer, a metal used in the second plating layer, or an alloy of the metals.

8. The multilayer ceramic electronic component according to claim 1, wherein
the first outer electrode includes a third plating layer covering the first plating layer; and
the second outer electrode includes a fourth plating layer covering the second plating layer.

9. The multilayer ceramic electronic component according to claim 1,
wherein a thickness of each of the first underlying electrode layer and the second underlying electrode layer is about 4 µm or more and about 7 µm or less at a position approximately in the middle with respect to a length in the stacking direction.

10. A method of producing a multilayer ceramic electronic component including a multilayer body including a plurality of stacked ceramic layers and including a first main surface and a second main surface that are opposite to each other in a stacking direction, a first side surface and a second side surface that are opposite to each other in a width direction orthogonal or substantially orthogonal to the stacking direction, and a first end surface and a second end surface that are opposite to each other in a length direction orthogonal or substantially orthogonal to the stacking direction and the width direction, the method comprising the steps of:
forming a first underlying electrode layer and a second underlying electrode layer on the first end surface and the second end surface, respectively;
forming a first conductive resin layer and a second conductive resin layer to cover the first underlying electrode layer and the second underlying electrode layer, respectively; and
forming a first plating layer and a second plating layer to cover the first conductive resin layer and the second conductive resin layer, respectively; wherein
the first underlying electrode layer is joined to the first plating layer without the first conductive resin layer interposed therebetween only in a first connecting portion on corner portions and ridge line portions of a surface opposing the first end surface; and
the second underlying electrode layer is joined to the second plating layer without the second conductive resin layer interposed therebetween only in a second connecting portion on corner portions and ridge line portions of a surface opposing the second end surface.

11. The multilayer ceramic electronic component according to claim 1, further comprising a plurality of floating inner electrode layers which are not connected to either of the first outer electrode or the second outer electrode.

12. The multilayer ceramic electronic component according to claim 1, wherein an inner surface of the first underlying electrode layer is only on the surface of the first end surface and an inner surface of the second underlying electrode layer is only on the surface of the second end surface.

13. The method of producing the multilayer ceramic electronic component according to claim 10, wherein the first underlying electrode layer and the first plating layer are directly joined to each other in the first connecting portion, and the second underlying electrode layer and the second plating layer are directly joined to each other in the second connecting portion.

* * * * *